May 7, 1957    W. J. GAWRYSIAK    2,791,527
ARTICULATED MOLDING
Filed July 15, 1955
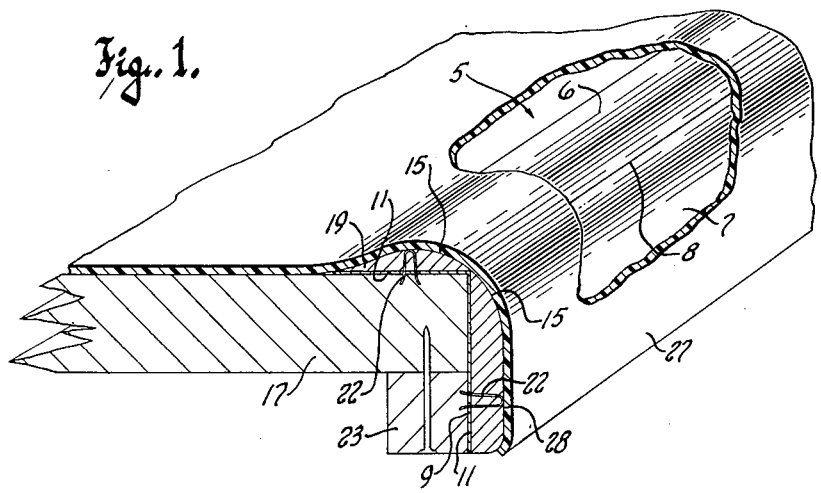
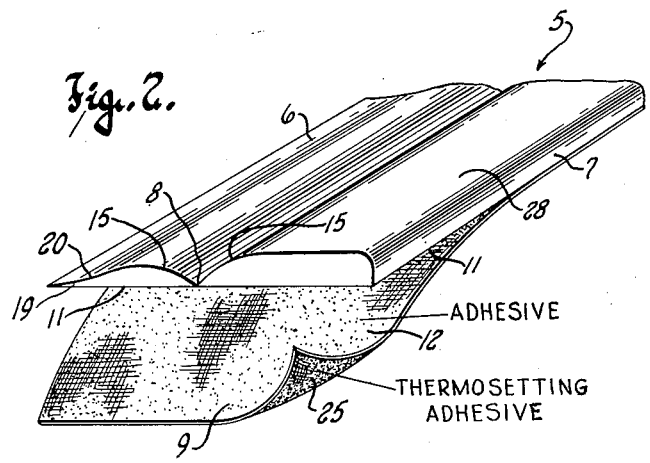
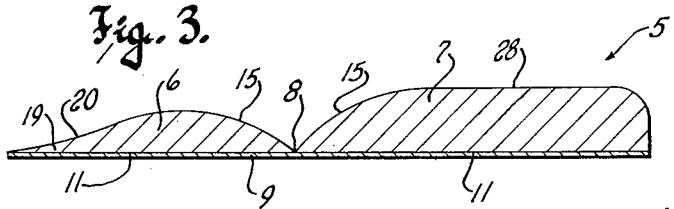
Inventor
Walter J. Gawrysiak : 2,791,527
Patented May 7, 1957

2,791,527

ARTICULATED MOLDING

Walter J. Gawrysiak, West Allis, Wis.

Application July 15, 1955, Serial No. 522,247

6 Claims. (Cl. 154—53.5)

This invention relates generally to moldings of the type employed as trimming at the corners defined by meeting surfaces, and has as its principal object the provision of improved molding comprised of a plurality of elongated side by side molding sections hingedly connected together for edgewise articulation and having exposed curved surfaces shaped to complement one another upon relative hinging motion of the sections to dispose them in predetermined angular relationship.

More specifically, it is the purpose of this invention to provide a molding comprised of edgewise articulated molding sections of the character described and which is especially adapted for application to an edge of a panel to provide a nicely rounded nosing therefor.

In this respect, the articulated molding of this invention is intended as a replacement for the one-piece moldings heretofore commonly secured to the front edge of a plywood sink top prior to the molding of a Formica or other plastic sheath thereover. It is the purpose of such conventional moldings to not only produce a nicely rounded nosing along the front edge of a plywood panel for a sink top, but to provide a convex surface projecting above the plane of the sink top so that the front edge thereof will be drip-free after the plastic sheath has been molded thereover. Nosings of this conventional type are not only expensive, but are difficult to produce and costly to ship. Moreover, both trimming and rabbeting of the front edge of the plywood panel is necessary to prepare it for reception of the conventional one-piece molding, and an objectionable waste of plywood is thus attendant upon the use of such moldings.

The articulated molding of this invention, while of general utility, is particularly adapted to more conveniently and economically serve the same purpose as the conventional one-piece moldings described, namely that of providing a nicely rounded nosing having an upward rise at its top when applied to the front edge of a sink top panel preliminary to molding of a plastic sheath thereover.

Still another purpose of this invention resides in the provision of articulated molding of the character described which has a thermosetting adhesive coating on the surfaces thereof which engage the front of a sink top panel having the molding applied thereto, and which adhesive coating is adapted to be activated by the heat and pressure employed to mold the outer plastic sheath on the sink top to thus permanently secure the molding in place on the sink top.

Another and highly important object of this invention also resides in the provision of articulated molding of the character described, made from relatively thin edgewise adjacent molding sections hinged together by a flexible backing strip secured to the undersides of the molding sections to facilitate their application to a corner defined by adjacent meeting surfaces to be trimmed.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a fragmentary perspective view, partially in section, of the top front portion of a molded sink top having the articulated molding of this invention applied thereto to provide the nosing for the front of the panel;

Figure 2 is a perspective view of the articulated molding of this invention showing the construction thereof; and Figure 3 is a cross sectional view through the articulated molding of this invention.

Referring now more particularly to the accompanying drawing in which like numerals indicate like parts, the articulated molding of this invention is generally designated by the numeral 5. As seen best in Figures 2 and 3, the molding comprises a plurality of thin elongated molding sections, in this case two side by side sections 6 and 7, joined together along their contiguous longitudinal edges 8 by means of a backing strip 9 of cloth or other thin flexible material.

The molding strips 6 and 7 may be made of solid wood or even an extruded plastic material provided with the proper cross sectional shape at the time of extrusion. If desired, the molding sections can also be made of sawdust mixed with a suitable binder and extruded to the desired shape.

As shown in Figures 2 and 3, the underside 11 of each of the molding sections or strips is flat and the backing 9 is secured flatwise to the undersides of the molding strips to connect the same together with their adjacent longitudinal edges closely adjacent to one another and in a manner providing for hinging motion thereof about a longitudinal axis directly adjacent to the contiguous edges 8 of the strips. While the backing may be secured to the flat undesides of the molding strips in any suitable manner, it has been found advantageous to glue the backing thereto by a suitable adhesive applied either to the flat undersides of the molding strips or to the backing itself as at 12. With an adhesive bond between the backing strip and the flat undersides of the molding strips, the latter are maintained with their flat undersides in intimate engagement with the backing across the entire width of the backing and are thereby constrained to hinging motion relative to one another along their contiguous edges.

The cross sectional contour of the exposed outer faces of the molding strips is dictated by the shape which the molding is to have when its sections are swung about their hinge for application to the corner defined by a pair of meeting surfaces. The outer surfaces of the molding strips, therefore, may have a concave curvature in cross section if the molding is to be used in a corner, in which case application of the molding requires swinging of its hingedly connected sections in directions to bring their outer surfaces toward one another to a position at which their concave outer surfaces are complementary. The molding illustrated, however, is adapted to be applied around the exterior of a corner such as that defined by an edge of a panel 17 or the like. Consequently, a substantial area of each of the exposed surfaces of the strips adjacent to their contiguous edges is convexly curved as at 15, with the curved surfaces of the same radii and intersecting the plane of the flat undersides of the strips at the hinge line as shown best in Figure 3.

The molding illustrated, therefore, is adapted to have its articulated sections hinged in a direction to bring their flat undersides toward one another when applied to the front upper corner of the panel in the manner illustrated in Figure 1, and when the sections are disposed at right angles to each other, the adjacent convex surfaces 15 on the strips are complementary to one another and define a continuous rounded outer surface extending across the hinge axis of the sections.

With the molding section 6 disposed on the horizontal upper surface of the panel 17 and the section 7 disposed flatwise against the vertical front edge of the panel in the manner shown in Figure 1, the articulated molding of this invention provides a nicely rounded nosing, the upper surface of which lies at an elevation above the top surface of the panel.

In order to avoid a recessing or rabbeting operation on the top front portion of the panel 17, the molding section 6 is preferably provided with an outer feathered edge portion 19 which may be obtained by providing the section with a downwardly and outwardly converging surface 20 at its exterior leading from the convexly curved portion 15 thereon to the edge of the strip 6 remote from the hinge connection between the articulated molding strips. If desired, the outer surface 20 which defines the feathered edge of the strip 6 may be made slightly concave to more gradually merge into the plane of its underside as well as that of the top surface of the panel 17.

Staples 22 driven through the molding sections 6 and into the top of the plywood panel 17 may be employed to either temporarily or permanently attach the same to the panel. The front vertically disposed molding section 7 may be similarly attached to the front edge of the panel, as by staples 22, but since it has a greater width than the upper molding section 6, it may be desirable to staple the strip 7 to a cleat 23 nailed to the underside of the plywood panel flush with the front edge thereof.

When the molding sections are employed to provide a rounded nosing for the front edge of a sink top which is to have a sheath 27 of plastic material molded thereover by heat and pressure, the molding sections may be permanently secured to the panel by a thermosetting adhesive, preferably comprising a coating 25 thereof on the exposed undersurface of the flexible backing 9. In that case, only a few staples 22 need be employed to temporarily hold the molding strips in place around the upper front corner of the panel 17 prior to molding of the plastic sheath thereover.

It will be understood, of course, that in instances where the sink top is to be covered by some other type of material, as for instance inlaid linoleum, an articulated molding having a pressure sensitive or moisture activated adhesive coating applied to the underside of its backing 9 will suffice to hold the molding in place prior to the securement of the sheath thereover.

While the outer exposed surface 20 of the molding strip 6 is shown provided with reverse curvature, the outer exposed surface 28 of the strip 7 may be flat and tangent to its convexly curved surface 15, but parallel the flat underside 11 of the strip.

From the foregoing description taken together with the accompanying drawing, it will be readily apparent to those skilled in the art that this invention provides an improved molding featuring thin, edgewise articulated complementary molding sections ideally suited as trim for corners generally but especially adapted for use on the edges of panels and the like to provide a low cost nosing therefor.

What I claim as my invention is:

1. An article of manufacture, comprising: a thin freely flexible backing strip; a pair of elongated edgewise contiguous molding strips having flat undersides and having non-planar outer sides which taper in the transverse dimensions of the strips, toward their contiguous edges, at acute angles to the undersides of the strips and define opposing sharp corners along the contiguous edges of the molding strips, each of said corners lying in the plane of the underside of its strip; and means flatwise securing the backing strip to the undersides of the molding strips with the backing strip extending lengthwise of the molding strips and spanning the adjacent longitudinal edge portions of the molding strips so as to provide a hinge connection between the molding strips enabling the same to be freely swung out of positions at which their flat undersides lie in a common plane, in directions to carry their flat undersides toward one another, about a longitudinal axis substantially lying in the plane of the backing strip and directly adjacent to the opposing sharp corners on the strips, at least an extent such that the included angle defined by the flat undersides of the molding strips is approximately 90° and the flat undersides of the molding strips define a sharp right angle corner recess, and at which positions the non-planar surfaces on the outer sides of the molding strips along their adjacent longitudinal edge portions are substantially uninterruptedly complementary to one another.

2. The article of manufacture set forth in claim 1 further characterized by the provision of an adhesive coating applied to the exposed face of said backing strip.

3. The article of manufacture set forth in claim 2 wherein said coating on the exposed face of the backing strip comprises a thermosetting adhesive.

4. The article of manufacture set forth in claim 1 wherein said tapered portions of the molding strips are convexly curved to jointly define a substantially continuous rounded outer surface across said hinge axis when the molding strips are swung thereon to positions at which the included angle defined by their flat undersides is 90°.

5. The article of manufacture set forth in claim 4 further characterized by the fact that the exposed surface of one of said molding strips converges toward the outer longitudinal edge of said one strip from the convexly curved area thereof and provides a feathered outer edge portion on said one strip.

6. The article of manufacture set forth in claim 5 further characterized by the fact that the exposed surface of the other of said molding strips which lies between the outer edge and the convexly curved area thereof is parallel to said flat face of said other strip and tangent to the convexly curved area thereof, and said other strip being wider than the strip having the feathered outer edge portion.

References Cited in the file of this patent

UNITED STATES PATENTS

| | | |
|---|---|---|
| 468,354 | Mayhew | Feb. 9, 1892 |
| 1,630,858 | Meyercord | May 31, 1927 |
| 1,900,824 | Lewis | Mar. 7, 1933 |
| 1,958,131 | Davidson | May 8, 1934 |
| 2,253,219 | Alexander | Aug. 19, 1941 |